UNITED STATES PATENT OFFICE.

ALBERT H. HENDERSON, OF BALTIMORE, MARYLAND, ASSIGNOR TO THE HENDERSON RUBBER COMPANY, OF BALTIMORE, MARYLAND, A CORPORATION OF MARYLAND.

COMPOSITION OF MATTER.

1,020,497.  Specification of Letters Patent.  Patented Mar. 19, 1912.

No Drawing.  Application filed April 6, 1911. Serial No. 619,404.

*To all whom it may concern:*

Be it known that I, ALBERT H. HENDERSON, a citizen of the United States, residing at Baltimore, State of Maryland, have invented new and useful Improvements in Composition of Matter, of which the following is a specification.

My invention relates to an improved composition of matter designed to have great strength and tenacity as well as elastic and resilient properties, it being intended for use in any way and for any purpose where such a substance is desirable, as for example, as a body, filler, lining or element in wheel tires, such as those adapted for automobiles, or ordinary vehicles, or in any of the industrial arts.

In my application executed and filed of even date herewith and bearing Serial No. 619,405, I have set forth and claimed a method suited to the production of such a composition of matter as is herein described and claimed; but it is to be distinctly understood that I do not limit myself to any specific method for producing my improved composition, but reserve the right to claim it irrespective of the mode of manufacture.

In carrying out my invention I treat rawhide in the form of disks or slugs, or in fragmentary or granulated condition, in such manner as to soften the rawhide, expand it considerably beyond its normal state, and permanently open its pores; and thereafter impregnate it with rubber whereby it is made permanently flexible or resilient. My preferred way of imparting to the rawhide this softened, swollen or practically spongy condition is by subjecting it to an agent miscible with either oil or water, and with or without heat, subsequently in greater part removing this agent by means of a solvent, and thereafter removing the latter by suitable means, after which rubber, in the form of a solution, or of a heated fluid, is introduced into the spongy rawhide substance.

The reason for the preferred use of a swelling agent which is miscible with both oil and water is as follows: Where, for example, plain water is used for swelling rawhide it has been found difficult to expel the water and replace it with either oil or rubber solutions; whereas by using a swelling agent miscible with either oil or water such displacement is more readily made on account of the mutual solubilities. When rawhide is swollen in a liquid composed of say one half water and one half oil, and the water is removed by evaporation or heat, we have left one half of the swelling agent as oil which is soluble in many of the well known rubber solvents and which, it is obvious, will allow an interchange of solutions of rubber and oil. This therefore affords a practical method for the introduction of rubber into rawhide in a swollen state and at the same time one not too expensive. Efforts have been made to introduce rubber solutions into materials by various methods, but on account of the thick nature of the rubber solutions they have not proved successful. After treatment with the swelling agent the softened, swollen or spongy rawhide substance is solidified under pressure, and the incorporated rubber vulcanized either by the admission thereto of the proper proportion of sulfur in any form during the act of solidification or thereafter.

My improved composition may be cut, rolled, pressed, molded or otherwise formed into bodies of various shapes and sizes fitted for adaptation to the various industrial arts. For example, it may be formed into slabs or sheets designed for use in the manufacture of tires, whether for automobiles or ordinary vehicles. When used as a filler or other element in the structure of an automobile tire the material, by reason of its great tenacity and strength, is practically proof against ordinary usage and wear, and especially against the effects of puncture, inasmuch as the rubber incorporated with the rawhide imparts to the whole such elasticity and resiliency that the tire, if punctured, is self-sealing.

The composition constituting my invention may be uniformly spread in sheets alternately with a woven or other fabric, the resultant body combining in itself great strength and pliability, and being applicable to various uses in the arts.

It is to be understood that wherever rubber is herein mentioned, and especially in the claims, I wish to include rubber substitutes or reclaimed rubbers as equivalents thereof. Among the rubber substitutes is an important and growing class of compounds, artificial in character, while others are natural products. Furthermore, with the rubber, however used, any of these substitutes or reclaimed rubbers, in smaller or larger quantities, may be employed.

Having thus described my invention, I claim:—

1. The herein described composition of matter, the same consisting of rawhide expanded to the form of a permanently spongy substance to the pores or interstices of which rubber is admitted, substantially as described.

2. The herein described composition of matter, the same consisting of rawhide expanded to the form of a permanently spongy substance permeated with rubber, substantially as described.

3. The herein described composition of matter, the same consisting of rawhide expanded to the form of a permanently spongy substance filled with vulcanized rubber, substantially as described.

4. The herein described composition of matter, the same consisting of fragments of rawhide brought to a spongy condition, permeated with rubber, and formed into a mass, substantially as described.

5. The herein described composition of matter, the same consisting of fragments of rawhide brought to a spongy condition the pores of which are filled with vulcanized rubber, substantially as described.

In testimony whereof I affix my signature in presence of two witnesses.

ALBERT H. HENDERSON.

Witnesses:
  P. W. JAMES,
  RAYMOND M. GLACKEN.